No. 686,545. Patented Nov. 12, 1901.
B. A. SELPH.
FOLDING REEL FOR BINDERS AND HARVESTERS.
(Application filed May 26, 1900.)
(No Model.)
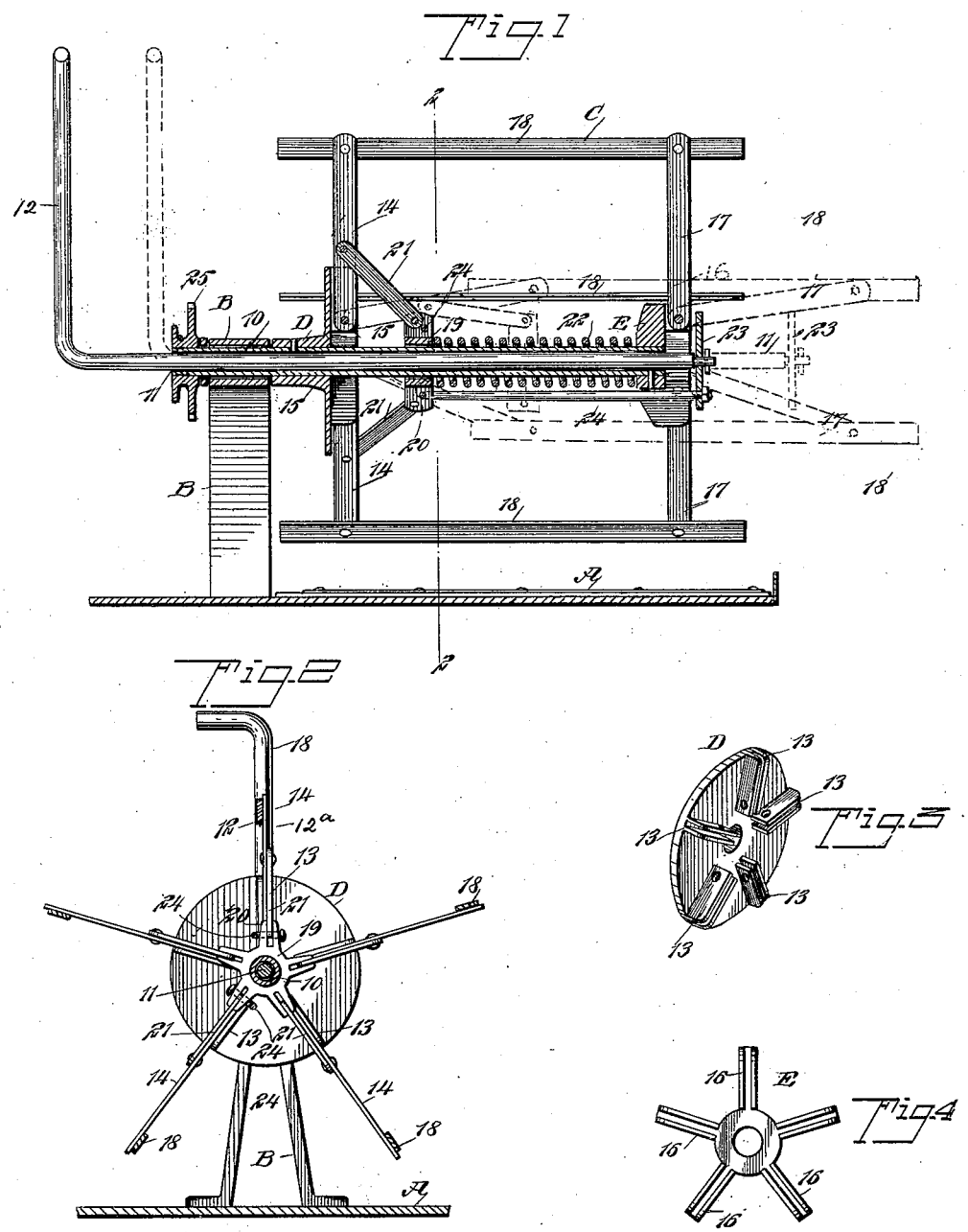
WITNESSES:
INVENTOR
Ben Ami Selph.
BY
ATTORNEYS

UNITED STATES PATENT OFFICE.

BEN AMI SELPH, OF HILLSBORO, OHIO, ASSIGNOR OF ONE-HALF TO ELIZABETH J. R. SELPH, OF HILLSBORO, OHIO.

FOLDING REEL FOR BINDERS AND HARVESTERS.

SPECIFICATION forming part of Letters Patent No. 686,545, dated November 12, 1901.

Application filed May 26, 1900. Serial No. 18,060. (No model.)

*To all whom it may concern:*

Be it known that I, BEN AMI SELPH, a citizen of the United States, and a resident of Hillsboro, in the county of Highland and State of Ohio, have invented a new and Improved Folding Reel for Binders and Harvesters, of which the following is a full, clear, and exact description.

The purpose of the invention is to so construct a reel for harvesters and binders that the reel can be instantly closed or opened or permitted to unfold or expand and operated by the driver without leaving the seat, thereby avoiding damage from obstacles either above or below the machine, and so that in drawing the machine from one field to another or to or from a field the reel may be tightly closed, rendering it less liable to damage than heretofore, and should the sickle-bar need any attention by closing the reel the operator will have no obstacle to interfere with his work, and also when the machine is to be housed by folding or closing the reel much less space will be required for storage than is customary in sheltering such machines.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the improved reel and the support for the same. Fig. 2 is a transverse vertical section taken practically on the line 2 2 of Fig. 1. Fig. 3 is a detail perspective view of one of the heads of the reel, and Fig. 4 is a detail perspective view of the opposing head.

A represents a support, and B a standard which is attached to the support, and the said standard carries a suitable box, in which a tubular shaft 10 is journaled. A solid shaft 11 is mounted to turn freely in the tubular shaft 10, and the solid shaft 11 extends beyond both ends of the tubular shaft, and at one end of the solid shaft 11 a crank-arm 12 is formed, which is adapted to be within convenient reach of the driver.

In the construction of the reel C two heads D and E are employed. (Shown in detail in Figs. 3 and 4.) These heads are secured in any suitable or approved manner to the tubular shaft 10. The inner head D is provided with sockets 13 upon its inner face, radially disposed, and in each of these sockets a spoke member 14 of the reel is pivoted by means of a suitable pin 15. On the outer surface of the outer head E of the reel sockets 16 are formed, and in these sockets the inner ends of spoke members 17 are pivoted, similar to the spoke members 14, attached to the inner head D, and corresponding spoke members 14 and 17 of the two heads D and E are pivotally connected by longitudinal rails or bars 18, which extend, preferably, beyond the outer edges of the said spoke members 14 and 17, as shown in Fig. 1.

A sleeve 19 is loosely mounted on the tubular shaft 10 near the inner head D of the reel, and this sleeve is provided with socket members 20, and links 21 are pivoted in the socket members of the sleeve 19 and to the spoke members 14 of the reel at a point above the sockets 13, formed upon the inner head D, as is best shown in Figs. 1 and 2. A spring 22 is coiled around the tubular shaft 10. This spring has bearing at one end against the sleeve 19 and at its opposite end against the inner surface of the hub portion of the outer head E of the reel C, as is best shown in Fig. 1. A plate 23 is secured upon the outer end of the solid shaft 11, and bars 24 connect this plate 23 with the upper and lower socket members 20, forming a portion of the sleeve 19. The reel is revolved by placing a suitable pulley or sprocket-wheel 25 upon one end of the tubular shaft 10, the said pulley or sprocket-wheel being connected with any source of power.

In the operation of the device when the reel is to be folded or closed the solid shaft 11 is forced outward in the tubular shaft 10, whereupon the members of the reel will be carried to the contracted position indicated in dotted lines in Fig. 1. The device may be held in closed position by hand or other suitable means may be employed.

Having thus described my invention, I claim as new and desire to secure by Letters Patent—

1. In a folding reel for binders and harvesters, a tubular shaft, a support for the said shaft, heads secured to the tubular shaft, spoke members pivoted in the said heads, bars connecting corresponding spoke members, a sleeve loosely mounted on the shaft, link connections between the said sleeve and one series of spoke members, an adjusting-shaft passed loosely through the tubular shaft, and a connection between the said sleeve and an end of the adjusting-shaft, as described.

2. In a folding reel for binders and harvesters, the combination, with a tubular shaft, a bearing for the same, means for revolving the tubular shaft, a reel carried by said tubular shaft, which reel consists of heads secured to the shaft, spoke members pivotally connected with the said heads, connecting bars or rods pivotally attached to opposing spoke members, a sleeve mounted to slide on the tubular shaft, and links pivotally connecting the said sleeve with one series of spoke members, of an adjusting-shaft mounted to slide in the tubular shaft, a plate secured to an end of the adjusting-shaft, rods connected with the said plate and with the sleeve mounted to slide on the tubular shaft, and a spring coiled around the tubular shaft between the said sleeve and the outer head of the reel, for the purpose set forth.

3. In folding reels for binders and harvesters, a tubular shaft, a support for the same, means for revolving the tubular shaft, and a reel mounted on said tubular shaft, the said reel comprising two heads secured to the shaft, having sockets formed upon the inner face of one head and upon the outer face of the opposing head, spoke members pivoted in the said sockets, and bars or rods connecting corresponding spoke members pivoted to the two heads, of a sleeve mounted to slide on the tubular shaft adjacent to the inner head of the reel, the said sleeve being provided with socket members, links pivotally connecting the socket members of the sleeve with the spoke members of the inner head of the reel, a spring coiled around the tubular shaft, engaging with the said sleeve and with the outer head of the said reel, an adjusting-shaft mounted to slide in the tubular shaft, and rods connecting the socket members of the sleeve with the outer end portion of the adjusting-shaft, for the purpose set forth.

In testimony whereof I have signed my name to this specification in the presence of two subscribing witnesses.

BEN AMI SELPH.

Witnesses:
A. D. WIGGINS,
OLIN J. ROSS.